United States Patent
Ong et al.

(10) Patent No.: US 8,923,146 B2
(45) Date of Patent: Dec. 30, 2014

(54) CHANNEL RESERVATION PROCEDURE

(75) Inventors: Eng Hwee Ong, Espoo (FI); Jarkko Kneckt, Espoo (FI)

(73) Assignee: Nokia Corporation, Espoo (FI)

( * ) Notice: Subject to any disclaimer, the term of this patent is extended or adjusted under 35 U.S.C. 154(b) by 431 days.

(21) Appl. No.: 13/222,041

(22) Filed: Aug. 31, 2011

(65) Prior Publication Data

US 2013/0051256 A1     Feb. 28, 2013

(51) Int. Cl.
| | |
|---|---|
| *H04L 12/26* | (2006.01) |
| *H04H 20/71* | (2008.01) |
| *H04W 72/04* | (2009.01) |
| *H04W 28/26* | (2009.01) |

(52) U.S. Cl.
CPC ............ *H04W 72/042* (2013.01); *H04W 28/26* (2013.01)
USPC .......................................... 370/252; 370/312

(58) Field of Classification Search
None
See application file for complete search history.

(56) References Cited

U.S. PATENT DOCUMENTS

| | | | |
|---|---|---|---|
| 6,466,794 B1* | 10/2002 | Posti et al. | 455/450 |
| 2007/0002814 A1* | 1/2007 | Benveniste | 370/338 |
| 2011/0051647 A1* | 3/2011 | Sampath et al. | 370/312 |

* cited by examiner

*Primary Examiner* — Afshawn Towfighi
(74) *Attorney, Agent, or Firm* — Harrington & Smith (57) ABSTRACT

A method, an apparatus, and a computer program are presented for carrying out channel reservations in a wireless communication system. A communication apparatus initiates a preliminary channel reservation procedure initiating related to a spatial multiplexing group transmission. The communication apparatus is caused to transmit during the preliminary channel reservation procedure a reservation request message announcing a preliminary group reservation on the channel. Upon completed preliminary channel reservation procedure, the communication apparatus is caused to utilize the preliminary group reservation by causing transmission of a frame on the reserved channel according to the spatially multiplexed wireless communication.

29 Claims, 6 Drawing Sheets

CHANNEL RESERVATION PROCEDURE

FIELD

The invention relates to the field of wireless telecommunications and, particularly, to carrying out channel reservation for a data transmission in a wireless communication system.

BACKGROUND

Some wireless communication systems negotiate radio channel reservation prior to carrying out actual data transmissions on the radio channel. The channel reservation is carried out in order to reduce the probability of colliding transmissions. Improved channel reservation mechanisms are needed to improve the performance of such wireless communication systems.

BRIEF DESCRIPTION

According to an aspect of the present invention, there is provided a method comprising: initiating, in a communication apparatus, a preliminary channel reservation procedure related to a spatial multiplexing group transmission; causing the communication apparatus to transmit during the preliminary channel reservation procedure a reservation message announcing a preliminary group reservation on the channel; and upon completed preliminary channel reservation procedure, causing the communication apparatus to utilize the preliminary group reservation by causing transmission of a frame on the reserved channel according to the spatially multiplexed wireless communication.

According to another aspect of the present invention, there is provided an apparatus comprising at least one processor; and at least one memory including a computer program code, wherein the at least one memory and the computer program code are configured, with the at least one processor, to cause the apparatus to: initiate a preliminary channel reservation procedure related to a spatial multiplexing group transmission; cause a communication apparatus to transmit during the preliminary channel reservation procedure a reservation message announcing a preliminary group reservation on the channel; and upon completed preliminary channel reservation procedure, cause the communication apparatus to utilize the preliminary group reservation by causing transmission of a frame on the reserved channel according to the spatially multiplexed wireless communication.

According to another aspect of the present invention, there is provided an apparatus comprising means for initiating, in a communication apparatus, a preliminary channel reservation procedure related to a spatial multiplexing group transmission; means for causing the communication apparatus to transmit during the preliminary channel reservation procedure a reservation message announcing a preliminary group reservation on the channel; and means for causing, upon completed preliminary channel reservation procedure, the communication apparatus to utilize the preliminary group reservation by causing transmission of a frame on the reserved channel according to the spatially multiplexed wireless communication.

According to yet another aspect of the present invention, there is provided a computer program product embodied on a non-transitory distribution medium readable by a computer and comprising program instructions which, when loaded into an apparatus, execute a computer process comprising: initiating, in a communication apparatus, a preliminary channel reservation procedure related to a spatial multiplexing group transmission; causing the communication apparatus to transmit during the preliminary channel reservation procedure a reservation message announcing a preliminary group reservation on the channel; and upon completed preliminary channel reservation procedure, causing the communication apparatus to utilize the preliminary group reservation by causing transmission of a frame on the reserved channel according to the spatially multiplexed wireless communication.

According to yet another aspect, there is provided a transitory or a non-transitory computer-readable distribution medium comprising the above-mentioned computer program product.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
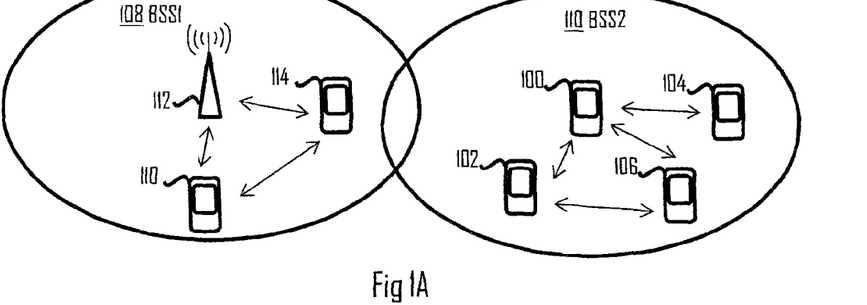
FIGS. 1A and 1B illustrate an example of a wireless communication system to which embodiments of the invention may be applied.

A general architecture of a wireless telecommunication system to which embodiments of the invention may be applied is illustrated in FIG. 1A. FIG. 1A illustrates two groups 108, 110 of wireless communication devices forming two basic service sets BSS1 and BSS2, e.g. groups of wireless communication devices comprising an access point (AP) 100, 112 and terminal stations (STA) 102, 104, 106, 110, 114 communicating with the access points 100, 112 of their respective groups. A basic service set (BSS) is a basic building block of an IEEE 802.11 wireless local area network (WLAN). The most common BSS type is an infrastructure BSS that includes a single AP together with all associated STAs. The AP may be a fixed AP as AP 112, or it may be a mobile AP as AP 100. The APs 100, 112 may also provide access to other networks, e.g. the Internet. In another embodiment, at least one of the BSSs is an independent BSS (IBSS) or a mesh BSS (MBSS) without a dedicated AP, and in such embodiments the communication device 100 may be a non-access-point terminal station. While embodiments of the invention are described in the context of the above-described topologies of IEEE 802.11 and, particularly, IEEE 802.11ac, it should be appreciated that these or other embodiments of the invention may be applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards. Some embodiments may be applicable to networks having features under development by IEEE 802.19 task group. Therefore, terms such as BSS should be understood broadly to encompass a wireless network in which the communication devices of the wireless network are distinguished as a group from communication devices of another wireless network.

Figure 1B:
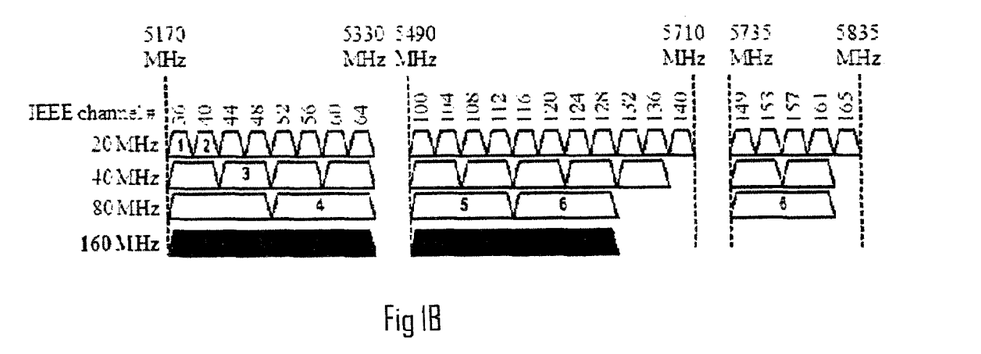

The 802.11n specifies a data transmission mode that includes 20 MHz wide primary and secondary channels. The primary channel is used in all data transmissions, and with clients supporting only the 20 MHz mode. A further definition in 802.11n is that the primary and secondary channels are adjacent. The 802.11n specification also defines a mode in which a STA can have only one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. FIG. 1B illustrates an exemplary channel structure for MHz, 40 MHz, 80 MHz, and 160 MHz channels. In this example, a 40 MHz transmission band is formed by two contiguous 20 MHz bands (denoted by numerals 1 and 2 in FIG. 1B), and an 80 MHz transmission band is formed by two contiguous 40 MHz bands (numerals 1, 2, 3). However, a 160 MHz band may be formed by two contiguous (numerals 1 to 4) or non-contiguous 80 MHz bands (numerals 1 to 3 for a first 80 MHz band and any one of bands denoted by numerals 5 and 6 for a second 80 MHz band).

As mentioned above, the transmission band of a BSS 108, 110 contains the primary channel and zero or more secondary channels. The secondary channels may be used to increase data transfer capacity of the transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Every STA is reducing a backoff value while the primary channel is sensed to be idle for a certain time interval, for instance 9 microseconds. When the backoff value reaches zero, the STA gains the TXOP and starts transmission. If another STA gains the TXOP before that, the backoff value is suspended, and the STA proceeds with the backoff after the TXOP of the other STA has ended and the primary channel is sensed to be idle. The time duration (the backoff value) may not be decremented at this stage, and the time duration that already lapsed before the suspension is also counted, which means that the STA now has a higher probability of gaining the TXOP. A secondary channel may be used in the transmission if it has been free for a determined time period (may be the same or different time period than that used for gaining the TXOP) just before TXOP start time in order for the contending STA to take the secondary channel in use.

Some IEEE 802.11 networks utilize an enhanced version of a basic access mechanism known as a distributed coordination function (DCF) where prioritized transmissions are taken into account. An example is enhanced distributed channel access (EDCA) where the backoff value and a contention window representing a time period when the channel contention is carried out are selected to prioritize access classes having a higher priority, e.g. a higher quality-of-service classification. The EDCA may also be carried out on the primary channel, and a STA winning the contention may expand the transmission band to the secondary channel(s) if the secondary channel(s) have been sensed to be available, e.g. through clear-channel assessment (CCA) for a determined time period, e.g. a point coordination function inter-frame space (PIFS) duration before the start of the TXOP.

A virtual carrier sensing function is provided by the provision of a network allocation vector (NAV) which is used to reserve a channel for the duration of the TXOP. Most of the transmitted frames comprise a duration field which can be used to reserve the medium, or provide duration of the NAV protection, for the duration indicated by the value of the duration field. In practice, the NAV is a timer that indicates the amount of time the medium will be reserved. In a typical operation, the transmitting and receiving stations (STAs) will set the NAV to the time for which they expect to use the medium while other STAs count down from the NAV to zero before starting the channel contention. The virtual carrier sensing function indicates that the medium is busy when NAV is non-zero and idle when NAV is zero. The NAV may be set to protect frame transmissions. The communication devices obtain the NAV on the primary channel of the BSS.

As already indicated above, some channel reservation mechanisms may be based on a coordinated channel access mechanism for mesh networks, e.g. mesh BSSs. Such a channel access mechanism for the mesh networks may be used as an additional and optional coordination function called mesh coordination function (MCF), and it may be applied exclusively to the mesh BSSs. The MCF may have both a contention-based channel access and a contention-free channel access mechanism. The contention-based mechanism may be the EDCA and the contention-free mechanism may be called a MCF coordinated channel access (MCCA) that optimizes frame exchanges in the mesh BSS.

Under the MCF, the basic unit of allocation of the right to transmit is the TXOP. Each TXOP is defined by a starting time and a defined maximum length. Under the MCF, there are two types of TXOPs: EDCA TXOPs and MCCA TXOPs. The EDCA TXOP is obtained by a mesh STA winning an instance of an EDCA contention. The MCCA TXOP is obtained by a mesh STA gaining control of the transmission medium during an MCCA opportunity (MCCAOP). The MCCAOP may be defined as an advance reservation of a time interval for its transmission by means of an MCCA Opportunity Reservation.

The MCCA is an optional access method that allows mesh STAs that implement MCCA to access the transmission medium at selected times with lower contention than would otherwise be allowed. MCCA may be used by a subset of mesh STAs in a mesh BSS.

The mesh STA transmitting an MCCAOP Setup Request frame to initiate an advance reservation is the MCCAOP owner of the MCCAOP reservation defined in this setup. The receivers of the MCCAOP Setup Request are the MCCAOP responders. The MCCAOP owner and the MCCAOP responders advertise this advance reservation to their neighbours via MCCAOP Advertisements. The MCCA-enabled neighbour mesh STAs that could cause interference to transmissions during these reserved time periods, or that would experience interference from them, shall not initiate a transmission during these reserved time periods. During its MCCAOP, the MCCAOP owning mesh STA obtains a TXOP by winning an instance of EDCA contention. Because of its advance reservation, the MCCAOP owning mesh STA experiences no competition from other MCCA-enabled neighbour mesh STAs. At the start of an MCCAOP, the EDCA of the MCCAOP owner replaces an arbitration inter-frame space number (AIFSN) and contention window parameters CWmin and CWmax of its dot11EDCATable with MCCA access parameters. In order to use MCCA, a mesh STA maintains synchronization with its neighbouring mesh STAs.

In an embodiment, the channel reservation may be carried out on one of the secondary channels. For this purpose, let us denote a term "primary channel of reservation" referring to the channel on which the TXOP is obtained. The primary channel of reservation may be understood as a primary channel for at least one of channel access, connection control, and data transmission with respect to the reservation in question. The other channels of the reservation may be secondary channels that may be understood as additional channels for data transmission. Some channel access functionalities may be performed also on secondary channel(s). The primary channel of reservation may be the primary channel of the BSS, but in other embodiments the reserving device may select the primary channel of reservation to be another channel. For example, an access point may be configured to use the primary channel of the BSS as the primary channel of reservation, but a terminal station wishing to transfer data directly with another terminal station may use another channel as the primary channel of reservation. The infrastructure network requires that non-AP STAs transmit and receive via the AP, unless the terminals have established direct links. The reservations by the AP may be made on the primary channel of the BSS. However, the AP may use another primary channel of reservation if all the terminal stations associated with the AP operate in a reservation-enabled state, wherein the terminal stations independently monitor the secondary channel(s) for reservations and/or for reservation advertisements being broadcasted by the AP and other terminal stations of the BSS and/or other BSSs. In the independent or mesh BSSs or mesh networks, the devices may transmit traffic directly to each other. The mesh STAs may carry out reservations on a different channel than the primary channel of the mesh BSS. The different channel may be used as the primary channel of reservation, for example, if all mesh STAs of the mesh BSS operate in the above-mentioned reservation-enabled state and/or if the devices of the mesh BSS not in the reservation-enabled state are in a sleep mode or in another mode that effectively avoids conflicting transmissions.

Using various channels for making the reservation enables reservation of secondary channels only, for example in a case where a first STA has a TXOP on the primary channel and on the secondary channel while the tertiary channel and the quaternary channel are free. A second STA may then gain TXOP on the tertiary and the quaternary channel by using one of those channels as the primary channel of reservation. This improves the spectral efficiency, as the channel utilization is improved.

In an embodiment, a reservation allocation vector (RAV) mechanism is applied on the basis of the channel reservation information, and reservation allocation vector protection has similar functionalities as the NAV but is logically different indicator for the channel reservation. The RAV may be set in connection with the advance or preliminary negotiation about the channel reservation, e.g. through the MCCAOP Setup Request Frame. It should be understood that the preliminary reservation may be made through other means as well. The preliminary reservation may be made and a corresponding RAV may be set by transmitting reservation messages, e.g. on the primary channel of reservation. Below, further embodiments related to the RAV and a plurality of different RAV types is discussed.

Figure 2:
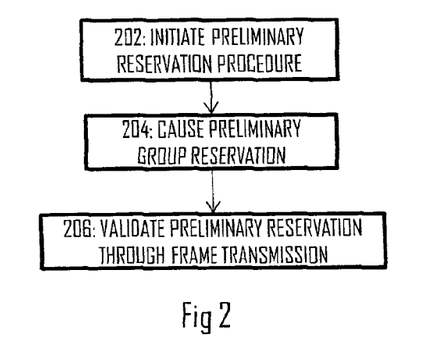
FIG. 2 illustrates a flow diagram of a process according to an embodiment of the invention.

Let us now consider an embodiment for carrying out a preliminary channel reservation with reference to FIG. 2. FIG. 2 illustrates the preliminary reservation from the point of view of a communication apparatus making the preliminary channel reservation. The process of FIG. 2 may be carried out in the communication apparatus, e.g. by at least one processor applicable to the communication apparatus. The process of FIG. 2 may be realized by a computer program code stored in a memory of the communication apparatus. Referring to FIG. 2, a preliminary channel reservation procedure related to a spatial multiplexing group transmission is initiated in block 202. In block 204, the communication apparatus is configured to transmit during the preliminary channel reservation procedure a reservation message. The reservation message announces the preliminary group reservation to any other device capable of detecting the reservation message. The reservation message may comprise at least one information element specifying the channel reservation relates to the spatial multiplexing group transmission. Upon completed preliminary channel reservation procedure, the communication apparatus is in block 206 configured to validate or utilize the preliminary reservation by causing transmission of a frame on the reserved channel according to the spatially multiplexed wireless communication. In an embodiment, the preliminary reservation triggers a RAV on the reserved channel, and the validation is realized by changing the RAV into the NAV through the frame transmission.

The above-described embodiment enables preliminary group reservations on at least some of the channels in order to enable group transmissions based on spatial multiplexing to be carried out on the reserved channel. Spatial multiplexing based on multiple-input-multiple-output (MIMO) technique improves capacity by exploiting space diversity, particularly when the channel quality is high. The definition of MIMO could be broadly classified to cover both single-user MIMO (SU-MIMO) and multi-user MIMO (MU-MIMO). The former improves the performance towards a single user by providing the single user with multiple spatially distributed transmission streams, whereas the latter enables multiple users to be served simultaneously through the use of spatial multiplexing techniques. The SU-MIMO embodiment may utilize either space-time coding where multiple antennas are used to carry the same space-diversity-coded information. This allows the system to use a higher modulation and coding scheme which improves the total throughput. Spatial multiplexing, which can be employed in both SU-MIMO and MU-MIMO, is an extension from this basic concept, wherein the spatially multiplexed streams carry different information. The capacity gains have been shown to be substantial in both SU-MIMO and MU-MIMO cases, particularly, when the channel quality in terms of a signal-to-noise ratio (SNR) is high.

In the context of 802.11ac, SU-MIMO has a fixed number of spatially multiplexed streams per physical layer convergence procedure (PLOP) protocol data unit (PPDU), while MU-MIMO has a fixed bandwidth per PPDU. The 802.11ac has defined some basic frameworks to facilitate SU-MIMO and MU-MIMO transmissions. The above-described embodiment provides a channel reservation procedure for use as a resource allocation scheme for SU-MIMO and/or MU-MIMO transmissions. The present channel reservation procedure can effectively exploit the diversity of time, frequency, and space in the reservation. The group transmission mentioned above should be understood to cover both SU-MIMO and MU-MIMO transmissions.

The above-described channel reservation procedure may be understood as the preliminary channel reservation procedure preceding a transmission on at least one reserved channel. The preliminary channel reservation may trigger the RAV on the reserved channel(s). Properties of the preliminary channel reservation may be modified before its validation by the frame transmission, for example, as will be described below. The frame transmission may then trigger actual channel reservation, e.g. the NAV, indicating the actual utilization of the preliminary channel reservation. The frame may comprise a data frame, a management frame, and/or a control frame. An example of the control frame is a request-to-send message. The frame transmission may utilize the preliminary reservation by changing the RAV into the NAV. The preliminary channel reservation may limit channel reservation options of other communication apparatuses. As a consequence, the preliminary channel reservation reduces a channel contention for the subsequent actual transmission, because it reduces the probability of overlapping reservations.

In an embodiment, the preliminary reservation covers all the channels, while in another embodiment the reservation message comprises an indication on a subset of channels related to the preliminary reservation. The reservation message may be transmitted on the primary channel of reservation. Some embodiments enable explicit reservation of the secondary channels. In some cases, this may improve the performance of the communication system by reducing the probability of conflicting transmissions on the secondary channels.

In an embodiment, the preliminary reservation is a periodic reservation, and the reservation message comprises at least one information element that specifies a plurality of separated, periodic reservation intervals. The reservation message may define, for example, a start timing of the reservation, duration of the reservation, and a periodicity of the reservation. Further details are described below.

Figure 3:
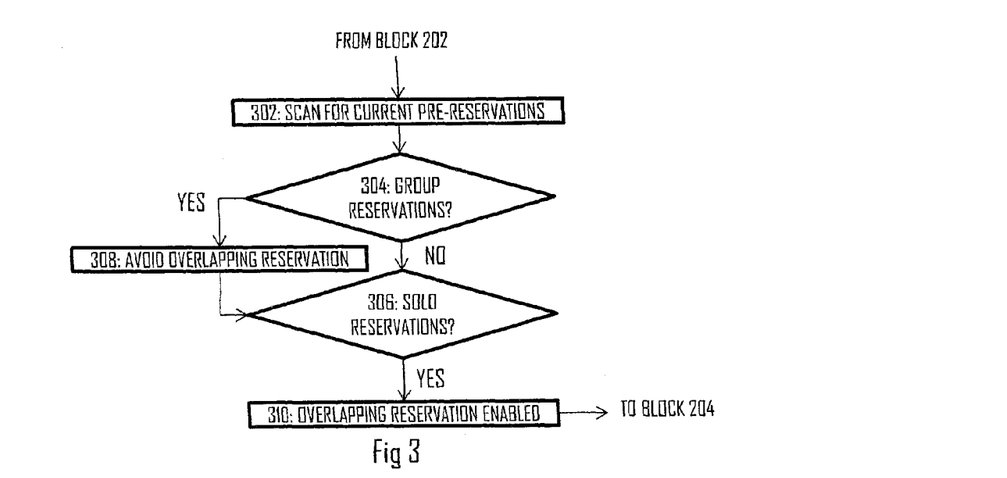
FIG. 3 illustrates a flow diagram of a process for prioritizing group reservations according to an embodiment of the invention.

In an embodiment, the group transmissions are prioritized over the normal single user transmissions without the MIMO capability. FIG. 3 illustrates an embodiment of a reservation resolution process for prioritizing the group transmissions. The process of FIG. 3 may be carried out in block 204 of FIG. 2 or between blocks 202 and 204. Referring to FIG. 3, the communication apparatus may be configured to first scan for the current reservation in the channel. The scanning is carried out in block 302. Block 302 may comprise analysing contents of signalling frames received from other communication apparatuses. For example, beacon frames, probe response frames and/or reservation advertisement frames transmitted in the BSS may comprise information on current reservations, and block 302 may comprise analysing the contents of such frames. Block 302 may cause the communication apparatus to transmit a probe request frame or a reservation advertisement request frame requesting at least one other communication apparatus to transmit respective probe response or reservation advertisement frame receivable by the communication apparatus. As a consequence, the communication apparatus gains as a response to the request knowledge about the current reservations and, if applicable, synchronization information.

The analysis of the current reservations may comprise checking whether or not there are any pending group reservations in block 304, wherein the group reservation refers to a reservation associated with spatially multiplexed MIMO transmission. If such group reservations are found (yes in block 304), the process proceeds to block 308 in which the preliminary reservation procedure of the communication apparatus is configured to avoid overlapping the preliminary reservation with the other group reservations. The preliminary channel reservation may then be directed to a channel and a time interval where there is no overlapping reservation. If no group reservations are found in block 304 or after block 308, the process proceeds to block 306 in which the presence of solo (non-group) reservations is checked. If such solo reservations are detected, the preliminary channel reservation related to the spatial multiplexing group transmission may be configured to overlap with any preliminary channel reservation related to a non-spatial-multiplexing type of single user transmission in block 310. The overlapping results in that the group reservation occupies the overlapping resources and, thus, overrules the pending solo reservation in the overlapped resources. Once the reserving device has announced the group reservation by transmitting the reservation message, the device that had the overlapping solo reservation may be configured to adjust its reservation parameters such that it avoids the transmission in the overlapping resources, for example. In an embodiment, the group reservation and solo reservation may both be adaptively adjusted in a manner favouring the group reservation by assigning to the group reservation a longer duration than the duration of a solo reservation or any solo reservation so as not to starve the solo reservations. If no such solo reservations are found, such overlapping naturally does not occur. Block 310 may also comprise checking whether or not it is possible to reserve the described channel capacity while maintaining the pending solo reservation. If such a possibility is detected, the non-overlapping reservation may be preferred over the overlapping reservation. In any case, the preliminary channel reservation related to the spatial multiplexing group transmission prevails over the preliminary channel reservation related to the non-spatial multiplexing single user transmission.

In another embodiment, the prioritization of the group reservation over the solo reservation is carried out by first detecting the possibility for the group reservation. If the group reservation is possible, e.g. the channel state allows spatial multiplexing and/there is data to be transmitted/received to/from a plurality of target devices, the group reservation may be selected. Only if the group reservation is not possible, the solo reservation is then selected.

In yet another embodiment, the prioritization of the group reservations is realized by defining at least one group reservation resource and at least one solo reservation resource. The at least one group reservation resource may be dedicated to group reservations using MIMO transmissions, and the at least one solo reservation resource may be dedicated to non-group reservations using non-MIMO transmissions. By default, the group reservation resources may have a greater amount of resources than the resources of the solo reservation resources. In an embodiment, a determined number of channels define the group reservation resources, while another lower number of channels define the solo reservation resource. In another embodiment, a determined time interval on at least one channel is reserved for the group reservations with MIMO, while another shorter time interval is reserved for the solo reservations with no MIMO. In an embodiment, a hybrid scheme is provided where a first set of time-frequency resources is reserved for the group reservations with MIMO, while another, smaller set of time-frequency resources is reserved for the solo reservations with no MIMO.

Upon selecting the resources for the overlapping or non-overlapping preliminary reservation, the communication apparatus is configured to transmit the reservation message comprising an information element related to the preliminary group reservation. The information element may be comprised in the beacon frame, a probe response frame, a reservation request frame, and/or an advertisement frame, for example. The reservation message for use with such preliminary group reservations may comprise at least some of the fields defined in Table 1 below. Table 1 illustrates a format of a group reservation (GRes) advertisement element for use in any one of the embodiments for discovering existing preliminary group reservations listed above.

TABLE 1

| | | Field | | | |
|---|---|---|---|---|---|
| Element ID | Length | RI Count | RI Period | RI Offset | VHT Info |
| Octets 1 | 1 | 1 | 1 | 1 | 6 |

An Element Identifier (ID) field may be used to define the type of the information element, e.g. reservation advertisement message. A Length field may indicate the length of the Information field, e.g. nine. A Reservation Interval (RI) Count field indicates how many beacon frames, including the current one, occur before the next RI. A RI Count of 0 may indicate that the current traffic indication map (TIM) is the RI. A RI Period field may indicate the periodicity of the reservation in terms of a number of beacon intervals between successive RIs. For example, if all TIMs are RIs, the RI Period has a value of one. The RI Period value of 0 may be reserved. The RI Offset field may be an unsigned integer in units of 32 microseconds to indicate the start of the reservation in each RI. A Very High Throughput (VHT) Information field provides a VHT-enabled access point (VHT AP) of a given BSS additional information. An embodiment of the VHT Information field is shown in Table 2 below.

TABLE 2

| | Field | | | |
|---|---|---|---|---|
| Reservation ID | BSSID | MIMO Group Count | GRes Duration | Beacon Interval |
| Octets 1 | 1 | 1 | 1 | 2 |

The Reservation ID subfield may be an unsigned integer in which its combination with the BSS identifier (BSSID) is set to a unique value for each reservation. As a consequence, the combination of the reservation ID and the BSSID may be used to identify the reservation. The BSSID subfield may indicate the MAC address of the VHT AP of a BSS making the reservation. A MIMO Group Count subfield may indicate the total number of MIMO groups associated with this BSS in which the reservation is made. The MIMO groups may include the SU-MIMO groups and the MU-MIMO groups. The GRes Duration subfield may be an unsigned integer in units of 32 microseconds, and it may be used to indicate the GRes duration being reserved. Below, some embodiments for realizing fair time-sharing of the reservations are described, according to which an equal time share is allowed for each MIMO group within the BSS or even within multiple overlapping BSSs (OBSSs). The Beacon Interval subfield may be used to indicate the number of time units between target beacon transmission times (TBTTs) of the BSS. Note that the synchronization between OBSSs may be achieved by using the Timing Advertisement, Probe Response, or GRes Advertisement Request frame to acquire the Time Advertisement element according described below.

The above mentioned Advertisement Request frame, e.g. a GRes Advertisement Request frame, may be transmitted between VHT APs, e.g. from a VHT AP enabled to carry out group reservations (dot11groupTXOPActivated set to TRUE) to another group-reservation-enabled VHT AP (dot11groupTXOPActivated set to TRUE) in order to request GRes advertisements from the other VHT AP in a case of overlapping BSSs. This frame may be transmitted as targeted to an individual address or a group address. An embodiment of the format of the GRes Advertisement Request frame Action field is shown in Table 3 below.

TABLE 3

| Order | Information | Notes |
|---|---|---|
| 1 | Category | |
| 2 | VHT Action | |
| 3 | GRes Adv. element | This element is optionally present |
| 4 | Time Adv. element | This element is optionally present |

The Category field may be set to a value denoting the VHT. The VHT Action field may be set to the value denoting GRes Advertisement Request. The GRes Advertisement element is described above in connection with Table 1. The Time Advertisement element contains optional time synchronization information which may be used to describe the source of time corresponding to a time standard or information of an external time source, e.g. the coordinated universal time (UTC) at which a time synchronization function (TSF) timer is zero. As such, an estimate of the offset between the time standard and the TSF timer, and an estimate of the standard deviation of the error in the offset estimate may be available for the receiving device to align its own estimate of the time standard based on that of another device.

The Advertisement frame, e.g. a GRes advertisement frame, may be transmitted by a group-reservation-enabled VHT AP (with dot11groupTXOPActivated set to TRUE) to one or more neighbouring group-reservation-enabled VHT APs (dot11groupTXOPActivated set to TRUE). The advertisement frame may be transmitted as addressed to a target individual address or a group address. The format of the GRes Advertisement frame Action field is shown in Table 4 below.

TABLE 4

| Order | Information | Notes |
| --- | --- | --- |
| 1 | Category | |
| 2 | VHT Action | |
| 3 | GRes Adv. element | |
| 4 | Time Adv. Element | |

As with the advertisement request frame of Table 3, The Category field may be set to a value denoting the VHT. The VHT Action field may be set to the value denoting GRes Advertisement Request. The GRes Advertisement element is described above in connection with Table 1. The Time Advertisement element is described above-in connection with Table 3.

Figure 4A:
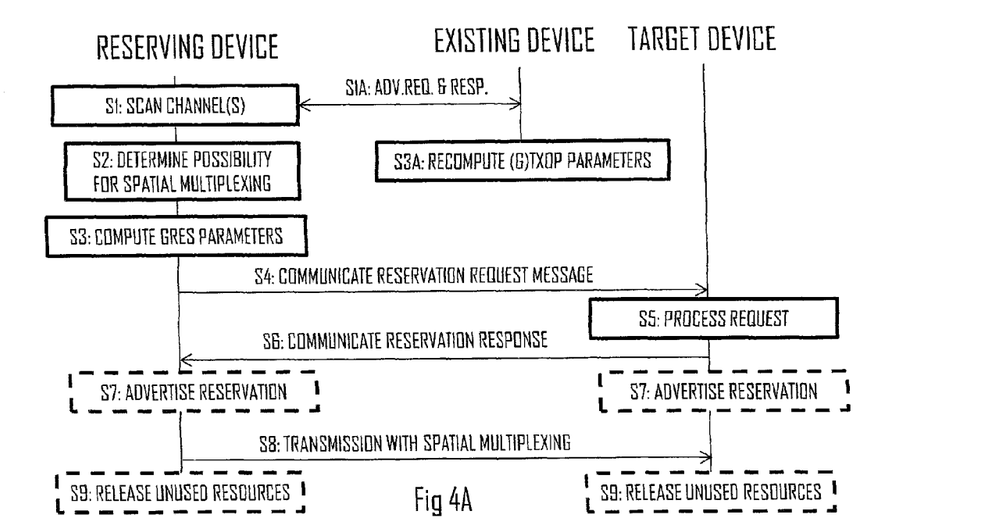
FIGS. 4A and 4B illustrate signalling diagrams related to channel reservation according to some embodiments of the invention.

Let us now describe a procedure of making the preliminary reservation and validating the preliminary reservation with reference to a signalling diagram of FIG. 4A. FIG. 4A illustrates signalling between a device making the preliminary reservation, e.g. an AP or a STA, and at least one target device which is an intended receiver during the group TXOP (GTXOP) associated with the group reservation (GRes). Referring to FIG. 4A, the reserving device scans in S1 the channel(s) including at least the primary channel of reservation. The scanning may include checking for any pending reservations, as described above. The checking may be carried out by the reserving device by transmitting an advertisement request frame (S1A). If a device with an existing reservation exists, such a device may respond in S1A by transmitting a GRes advertisement frame containing the GRes advertisement which contains properties of the pending group reservation and, optionally, the time synchronization information. The advertisement request frame and advertisement frame in S1A may be that of a management frame of subtype Action.

In S2, the reserving device determines a possibility for making the group reservation instead of the single-user-single-stream-transmission related solo reservation. S2 may comprise evaluating a channel quality metric of a channel between the reserving device and the target device. The channel quality metric may be a signal-to-noise ratio (SNR), signal-to-interference-plus-noise ratio (SINR), a path loss, or any other channel quality metric. In an embodiment, channel quality values, e.g. the SNR, is obtained from a VHT Compressed Beamforming Report field that is comprised in a VHT Compressed Beamforming frame of IEEE 802.11. If the channel quality metric indicates that the channel quality is higher than a determined threshold level, the group transmission may be enabled. On the other hand, if the channel quality metric indicates that the channel quality is lower than the determined threshold level, the MIMO group transmission may be disabled. S2 may comprise checking a channel state for a possibility for a SU-MIMO transmission. This may be carried out by determining whether or not the channel state indicates a presence of a plurality of sufficiently non-correlated spatial sub-channels. In an embodiment, S2 comprises checking for a presence of MU-MIMO groups associated with the target device and/or the reserving device. For example, if the reserving device has data to be transmitted to a plurality of receivers belonging to the same MU-MIMO group, it may select the MU-MIMO reservation over the SU-MIMO reservation. On the other hand, reserving device has data to be transmitted only to the target device or if the target device does not belong to any MU-MIMO group, it may select the SU-MIMO reservation over the MU-MIMO reservation. The MU-MIMO grouping may be carried out according to the state-of-the-art techniques by determining the channel states of a plurality of devices and the presence of sufficiently uncorrelated channels to enable the MU-MIMO grouping. In general, S2 may be used to determine whether or not the reserving device is enabled to make a group reservation or not. S2 may be seen as a state decision between a MIMO-capability and non-MIMO capability.

Figure 5A:
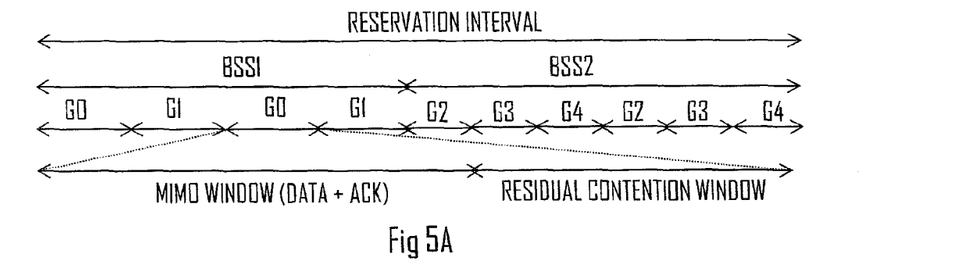
FIGS. 5A and 5B illustrate group transmission opportunity durations realized as a result of a fair sharing procedure according to some embodiments of the invention.

In S3, the reserving device computes (G)TXOP parameters. S3 may include computing the duration for the preliminary reservation. The duration may be computed so as to enable temporal fairness with respect to the other reservations. The duration may be selected sufficiently long to enable preliminary reservation that satisfies the needed throughput defined by a quality-of-service (QoS) classification, for example. On the other hand, the duration may be selected sufficiently short so as not to starve other members of the BSS or the overlapping BSS. In an embodiment, the duration is computed according to the following Equation (1):

$$D_{GRes,i} = F \frac{RI}{N_{OBSS} \cdot 2N_{group,i}}, \qquad (1)$$

wherein F denotes the amount of resources that are shared. The value of F may be higher than zero and lower than or equal to one. The value of F may be one to guarantee fairness in time shares between groups within a BSS. The value of F may be lower than one to define that less than the whole transmission time may be used. For example, if F equals to 1 the whole transmission time may be used for group reservations. On the other hand, if F equals to 0.5 only half of the whole transmission time may be reserved. In an embodiment, F is one by default and, therefore, it may be omitted from Equation (1). RI denotes the fixed length of the length of a periodic reservation interval (RI) (see Table 1 above). The time interval of the RI may be variable. The reservation interval may be defined as a contention reservation interval during which the preliminary reservations may be made, and the duration of the reservation interval may be known to the reserving device. $N_{OBSS}$ denotes the number of overlapping BSSs, including the BSS of the reserving device, and it may be used to share an equal time interval to each BSS in case of overlapping BSSs. $N_{group,i}$ defines the number of MIMO groups in the i-th BSS. The MIMO groups may include the MU-MIMO groups and the SU-MIMO devices, each SU-MIMO device being counted as a MIMO group. This parameter enables sharing an equal time share for each MIMO group within the BSS. In this embodiment, the solo reservations are not taken into account so as to prioritize the group reservations. FIG. 5A illustrates this embodiment, wherein the reservation interval is first divided equally between the OBSSs, namely BSS1, BSS2 (two in this example). Then, the resulting duration may be divided between an uplink transmission interval and a downlink transmission interval, and this division may also be equal. This is represented by the number "2" in Equation (1). The duration of the GRes for uplink/downlink is computed by the reserving device on the basis of the number of MIMO groups present in each BSS. In BSS1, there are two groups G0 and G1, so if the reserving device belongs to either G0 or G1, it computes the GRes duration by using a $N_{group,i}$ value of two (2). This results in equal time shares between G0 and G1 for uplink and downlink in the BSS1. In BSS2, there are three MIMO groups G2, G3, and G4, so if the reserving device belongs to either G2, G3, or G4, it computes the GRes duration by using a $N_{group,i}$ value of three (3). This results in equal time shares between the G2, G3, and G4 for uplink and downlink in the BSS2. As a consequence, the GRes duration is different between the BSS1 and BSS2, because there are different numbers of MIMO groups in the BSSs. Each GRes duration represented by G0 to G4 in FIG. 5A may be used for the transmission of data and associated acknowledgment according to the MIMO principles, e.g. spatial multiplexing. Upon carrying out the MIMO transmission and the acknowledgment, the reserving device or the target device may release the reservation to realize a residual non-MIMO contention window. During the residual non-MIMO contention window, any STA operating in the non-MIMO enabled state within the BSS may carry out channel contention so as to acquire a TXOP. All the devices operating in the MIMO enabled state may be prevented from contending for the channel access during the residual contention window. This prevention may be a default procedure in each device operating in the MIMO enabled state, e.g. such a device may be prevented from the channel contention during any other group reservation regardless whether or not it is released, or the device may be configured to discard any reservation release message related to the group reservation.

Figure 5B:
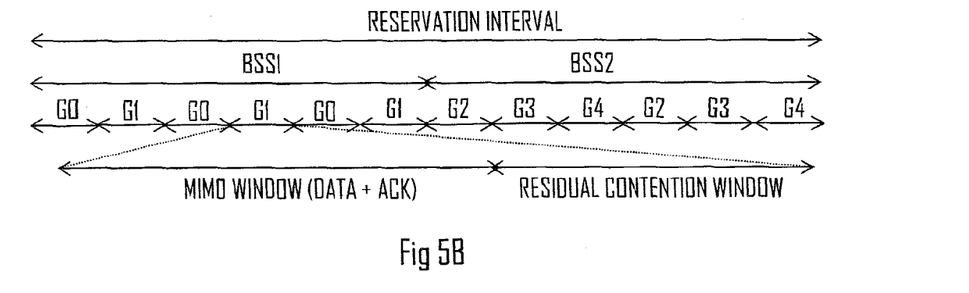

According to another embodiment, the computation of the GRes duration may take the overlapping BSSs better into account so as to enable global temporal fairness. In this embodiment, the duration of the GRes is computed to realize a duration that has an equal length in all OBSSs. An embodiment is shown in FIG. 5B, and the GRes duration may be computed according to the following Equation (2):

$$D_{GRes} = F \frac{RI}{2 \sum_i N_{group,i}} \quad (2)$$

In this embodiment, the reserving device takes into account all the MIMO groups within all OBSSs, e.g. BSS1 and BSS2. As a consequence, in the example of FIG. 5B having the total of five MIMO groups, the reserving device uses "5" as the parameter $$\sum_i N_{group,i}.$$

"2" denotes the division between the uplink and the downlink and, if the system does not use this default division, "2" may be removed from the Equation. This applies to Equation (1) as well.

Note that SU-MIMO transmission may be considered as a special case of MU-MIMO transmission. In an embodiment, a SU-MIMO group is indicated by a Group ID value 0 for uplink or mesh transmissions and by a Group ID value 63 for downlink transmissions. A MU-MIMO group may be identified by Group IDs ranging from 1 to 62. Further note from Equations (1) and (2), as well as FIGS. 5A and 5B, that uplink and downlink MIMO transmissions are allocated to separate GTXOPs, although in some embodiments both uplink and downlink transmissions may be carried out during one GTXOP.

Further with respect S3, when the reserving device is a member of an infrastructure BSS, e.g. an AP, it may compute the GRes duration according to Equation (1) to derive the local temporal fairness within the BSS or Equation (2) to derive the global temporal fairness amongst the OBSSs. On the other hand, if the reserving device is a member of a non-infrastructure BSS, e.g a STA of a mesh BSS, the reserving device may directly obtain the GRes duration from a GRes Advertisement element of Table 1. The GTXOP Advertisement element may be received from at least one neighbouring STA without computing from expression (1) or (2). Additionally, the reserving device may use the acquired time synchronization information to synchronize its RI or even its beacon interval to that of an existing BSS or a neighbouring STA prior to the reservation procedures of S4 to S6.

On the other hand, the existing device that responded to the reserving device may (re)compute the group reservation parameters of its own pending group reservation. The GRes duration may be modified in S3A if the existing device detects any changes in the RI, the number of groups, and/or the number of BSSs in an OBSS case, for example. Specifically, the GRes duration may be recomputed for different RIs, number of groups, and/or number of BSSs according to Equation (1) or (2). Note that the new GRes duration may only be valid in the next earliest RI. The existing device may advertise the changed group reservation parameters, and if the reserving device detects the change before S3, the reserving device may take the changes in to account before making the group reservation. However, if the reserving device detects the changes in the pending reservations after S3, it may also be configured to recompute the parameters of the preliminary reservation by repeating S3 and S4, for example.

In an embodiment, Equation (1) or (2) or another corresponding method for realizing the fair sharing of time-resources provides an upper limit for the reservation. Any reservation may be shorter than this upper limit, depending on the current reservation status in the BSS or in the OBSSs, the throughput requirements of the reserving device, etc.

Let us now return to FIG. 4A, wherein upon computing the parameters of the preliminary reservation in S3, the reserving device transmits the reservation request message identifying the parameters of the preliminary group reservation in S4. The reservation request message may be addressed to the target device. The reservation request message may set the RAV on the channel(s) defined in the preliminary reservation. More of the RAV types is described below. The target device receives the reservation request message and processes the request in S5. S5 may comprise checking for an overlapping preliminary and/or a non-preliminary channel reservation or an on-going transmission that prevails over the requested reservation. Let us note that as the target device and the reserving device are spatially separated, they experience different radio environments, and the target device may be aware of a reservation not known to the reserving device. The target device may be configured to identify the group reservation to scan for any pending group reservations in S5. It may discard any detected solo reservation, as a group reservation may overrule such solo reservations. In S6, the target device sends a reservation response message back to the reserving device. If a prevailing conflicting reservation is detected, then the target device may indicate in the reservation response message that the reservation request is denied. However, let us now assume that the target device did not detect a conflicting reservation and, as a consequence, it approves the reservation in the reservation response message in S6. As an alternative to S4 to S6, the reserving device being a member of an infrastructure BSS, e.g. an AP, may coordinate the channel access time of different MIMO groups by sending the GRes advertisement frame to each MIMO group in S4. In this case, S6 may then be omitted. Without the loss of generality, the modification of the preliminary reservation procedures due to the re-computation of GRes duration may be carried out by the existing device(s) in in a manner similar to the reserving device.

In S7, at least one of the reserving device and the target device may transmit a reservation advertisement message that notifies any other communication device about the reservation. The advertisement message may be the beacon frame, a probe response message, or any advertisement message, as described above. In an embodiment, S7 is optional. In another embodiment, S7 is carried out by default. Similarly, the existing device(s) may transmit a reservation advertisement message itself to notify any other communication device about the (modified or original) reservation.

In S8, the preliminary reservation is utilized by the MIMO transmission between the reserving device and the target device. The validation may be carried out by transmitting a data frame comprising a PLOP header. The validation may be realized by changing the RAV effectively into the NAV by the reception of a frame from either the owner or responder of the preliminary reservation, containing the Duration/ID field. A group identifier (ID) field of the PLOP header may be used to indicate a group ID of a data packet, e.g. a physical protocol data unit (PPDU), associated with the reservation. The PLOP header may be used to associate the preliminary reservation carried out in S4 to S6 to the data transmission of S8 that utilizes that reservation. With respect to associating the PPDU to the reservation, the PPDU may comprise an information element in a header of the PPDU, wherein the information element indicates whether or not the PPDU relates to a reservation. Such an information element may be comprised in a Very High Throughput (VHT) Sig A field of the IEEE 802.11ac. For example, the group ID called a partial association identifier (AID) of the number of space time streams (Nsts) field may be used to associate the identifier of the PPDU to the reserving device. S8 may also comprise the target device transmitting an acknowledgment for the data frame. Subsequent similar transmissions may be carried out within the GTXOP.

Figure 6:
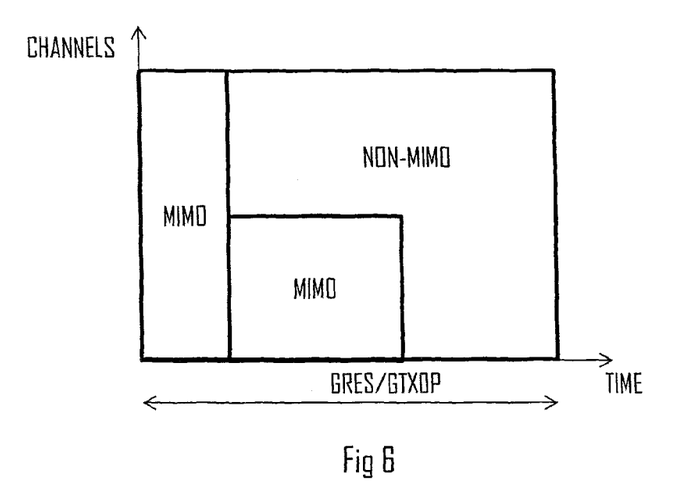
FIG. 6 illustrates an example of gradually releasing group transmission resources for non-group transmissions according to an embodiment of the invention.

In S9, after carrying at least one data transmission, the reserving device and/or the target device may determine to release the remaining GTXOP duration for the contention by the non-MIMO enabled devices. As a consequence, the reserving device and/or the target device transmit(s) in S9 a RAV release message that cancels the RAV for the GTXOP. The RAV release message may be transmitted in the PLCP header of the last transmitted PPDU. If the last transmitted PPDU is the first PPDU of the GTXOP, the cancellation may be seen as RAV Release, and if the last transmitted PPDU is any subsequent PPDU of the GTXOP and the RAV has already been changed to NAV, the cancellation may be seen as the NAV Release. The PLCP header may comprise an information element that explicitly cancels the RAV for that reservation. The information element may be a single bit indicating the "Release RAV". As a consequence, the duration of the RAV is effectively cancelled before the end of the reservation. The NAV protection that comes into effect upon the successful reception of a MAC header of the PPDU, protects the PPDU for its duration even though the RAV has been released. The release of the GTXOP reservation may be gradual, as shown in FIG. 6. FIG. 6 illustrates a frequency-time diagram illustrating utilization of resources within the GTXOP. FIG. 6 may be understood to include a space domain as an additional domain, wherein the MIMO transmissions have additional resources that may be divided in the space domain. Referring to FIG. 6, a first portion of a GTXOP may be used only for the MIMO transmission, e.g. MU-MIMO or SU-MIMO transmission. Thereafter, some of the frequency channels may be released for the contention by the non-MIMO enabled devices. As a consequence, for a given duration within the GTXOP, some of the channels are used for MIMO transmissions, while the other channels may be used for the NON-MIMO transmissions, as shown in FIG. 6. Thereafter, the whole remaining GTXOP duration may be released for NON-MIMO channel contention.

For a multi rate WLAN, temporal fairness according to the above-described embodiments, e.g. Equations (1) and (2), results in proportional fairness in throughput. The advantage of the proposed resource allocation scheme may be seen as fourfold. First, it allows prioritization of MIMO transmissions over non-MIMO transmissions when SNR is high, for example, to maximize capacity gains within the BSSs. Second, the complexity of such a three-dimensional resource allocation, wherein time, frequency, and space are taken into account, may be reduced by introducing the GTXOP with a fixed duration. This reduces a dimensionality of the problem, and reservation-greedy algorithms may then be applied to maximize the remaining frequency and space resources. Third, signalling required for setting up, detecting, and maintaining or book-keeping of reservations remains simple. As long as $N_{OBSS}$ is known, an equal time share within a BSS may be computed easily from expression (1). The detection of OBSS may be carried out by various means such as scanning by the AP and the detection of frames comprising an identifier of another BSS, for example. Moreover, equal GTXOP across BSSs of an OBSS may be derived through the knowledge of $N_{group}$ in each BSS, as used in expression (2). The $N_{group}$ of neighbouring BSSs may be acquired from any message comprising the GTXOP advertisement element of Table 1 and/or through any other signalling method. Other solutions for acquiring such information are naturally possible. As a result, the proposed scheme supports both centralized and decentralized operations, making it compatible to both infrastructure and non-infrastructure BSS. Fourth, a variable non-MIMO contention window may be available within each GTXOP. This improves the utilization of residual GTXOP and avoids starvation of non-MIMO enabled devices.

As described above, the preliminary channel reservation may trigger a reservation allocation vector (RAV) which may indicate the duration of the intended reservation to the other devices receiving the reservation request message, the reservation response message, and/or the reservation advertisement message. The RAV may have properties similar to the NAV, e.g. it may prevent subsequent overlapping reservations of the channel(s) unless they fulfil the above-mentioned rules. However, as already mentioned above, the RAV relates to the preliminary reservation of the channel, while NAV typically relates to actual utilization of the channel. Furthermore, the RAV may be set as a semi-static parameter that may be set to start in a defined time point in the future and it may be repeated in a predefined manner, while the NAV is triggered immediately upon transmission of an appropriate message, e.g. RTS, CTS, or PPDU. The RAV parameters, e.g. start time, duration, and periodicity, may be specified in the reservation message, as described above.

In an embodiment, the RAV is used for non-group reservations, and at least one new, logically different RAV is used for the group reservations. Providing the at least one other RAV enables the identification of the group reservations and the non-group reservations. It also enables the prioritization of the group reservations over the non-group reservations. The concept of the RAV is extended to a hierarchical RAV scheme, wherein at least one of a BSS RAV (BRAV) and a group RAV (GRAV) is used in addition to the RAV. The BRAV may in general be called a network reservation allocation vector. The BRAV may operate on the highest level of the hierarchy followed by the GRAV and finally the RAV. The BRAV may be used to prevent conflicting group (MIMO) reservations between BSSs in a case of overlapping BSSs. The BRAV may define a time interval when only devices in the BSS that set the BRAV may carry out channel access in order to transmit data. As a consequence, any other overlapping BSS is configured to suspend the channel access for the duration of the BRAV and, as a consequence, the contention in the media is reduced for the BRAV duration. A device of the BSS owning the BRAV, e.g. an AP, may cancel the BRAV during the BRAV with an explicit information element, e.g. a bit, in the PLOP header of a transmitted frame. In other embodiments, the BRAV may be cancelled even before the BRAV duration begins with an explicit information element in an advertisement message transmitted by the device of the BSS owning the BRAV.

The GRAV may be used to prevent conflicting group (MIMO) reservations within a BSS. The RAV may be used to prevent conflicting non-group (solo) reservations within the BSS.

Figure 4B:
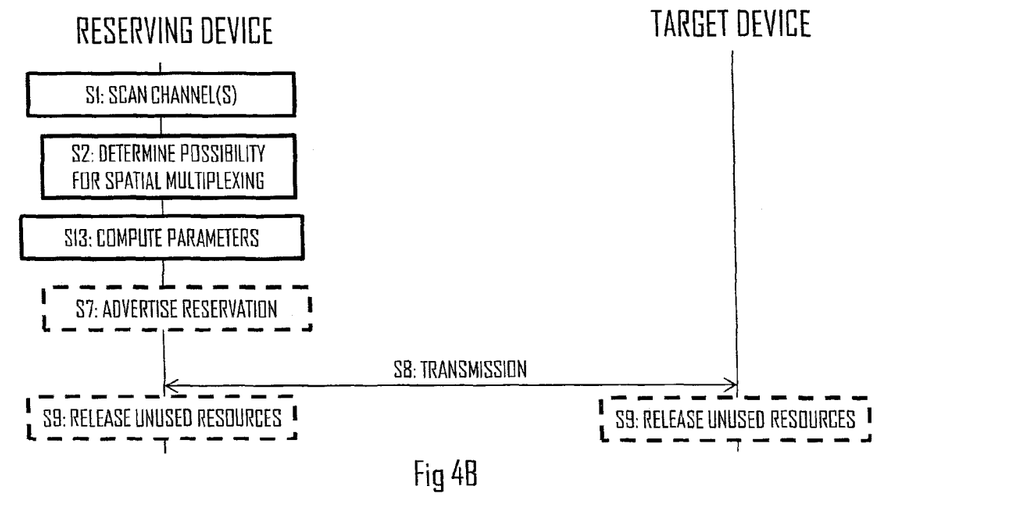

FIG. 4B illustrates a diagram of an embodiment in which the reserving device makes the preliminary group reservation without the request-response handshake. In FIG. 4B, the same reference signs as in FIG. 4A represent the same or similar procedures. As a consequence, the reserving device, e.g. an AP, scans in S1 the channel(s) for pending reservations and/or transmissions. In S2, it determines the possibility for the group reservation. In S13, the reserving device computes the parameters for the (group) reservation. Depending on the type of the reservation, the computation may vary. For example, if the reserving device makes the preliminary group reservation for MIMO transmission, it may compute the duration of the reservation by using Equation (1) or (2) as a maximum duration for the reservation. On the other hand, if the preliminary reservation relates to reserving the transmission medium for a channel access within the BSS of the reserving device, e.g. a preliminary BSS reservation to trigger a BRAV to prevent other BSSs from carrying out channel access in the reserved medium, the reserving device may compute a duration which is longer than that obtained through Equation (1) or (2). The preliminary reservation as a term may be defined to encompass both preliminary group reservations setting the GRAV and preliminary BSS reservations setting the BRAV. The reserving device may compute the duration, for example, with Equation (3) below. Upon computing the reservation parameters, the reserving device transmits in S7 a reservation advertisement message that announces the preliminary reservation to any device capable of receiving the advertisement. In the embodiment where the reservation is a BRAV type of reservation, a member of the BSS of the reserving device may be configured to carry out channel contention during the reservation. However, a device which is not a member of the BSS of the reserving device may be configured to suspend channel access during the reservation identified in the received advertisement message. In S8, the transmission may be carried out in the BSS of the reserving device during the reservation, e.g. between the reserving device and the target device and/or by at least one device not including the reserving device. In S9, the reservation may be released, as described above.

Figure 7:
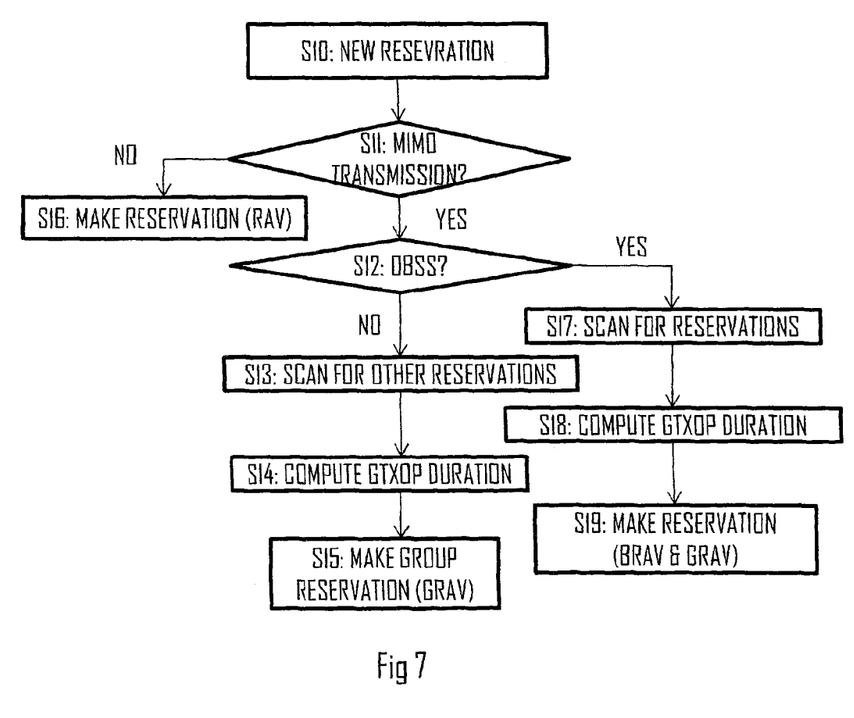
FIG. 7 illustrates a flow diagram of a process for selecting a preliminary reservation type and for carrying out a corresponding preliminary reservation according to an embodiment of the invention.

FIG. 7 illustrates an embodiment of operation of a reserving device in a BSS that supports all reservation allocation vectors BRAV, GRAV, and RAV. Referring to FIG. 7, the reserving device decides to make a new reservation in S10. In S11, the reserving device makes a decision whether or not to make a group reservation or a non-group reservation by determining the possibilities for the MIMO transmission by using the spatial multiplexing. If the group reservation is not possible or enabled in the reserving device, the process proceeds to block S16 in which the reserving device makes a non-group reservation. This type of reservation triggers the RAV on the reserved channel(s). However, if the group reservation is possible in S11, the process proceeds to block S12 in which the reserving device determines the presence/absence of overlapping BSSs. IF no overlapping BSSs are detected, the process proceeds to block S13 in which the reserving device determines the currently pending reservations in order to determine a free time interval for the preliminary group reservation. In block S14, the GTXOP duration and any other parameter related to the reservation are computed. The GTXOP duration may be computed according to Equation (1) or (2), for example. In S15, the group reservation is made by transmitting the reservation message that triggers the GRAV. The GRAV may overrule any conflicting RAV, as described in the reservation resolution process of FIG. 3.

On the other hand, if an overlapping BSS is detected in S12, the process proceeds to S17 in which the reserving device determines the current reservations in any one of the BSSs that overlap. S17 may comprise determining the presence/absence of any BRAV or GRAV. As a consequence, a time interval for the preliminary reservation that avoids conflicting with pending reservations and/or transmissions may be derived. The GTXOP duration and any other parameter related to the reservation are computed in S18. The GTXOP duration may be computed according to Equation (1) or (2), for example. In S19, the preliminary BSS reservation is made by transmitting the reservation message that, subsequently, triggers the BRAV. The BRAV may prevail over any conflicting RAV in all OBSSs. The BRAV may be understood as a "busy-tone" for any other overlapping BSS, thus reserving the channel(s) for the BSS of the reserving device. The devices of the BSS of the reserving device may make reservations within the BRAV duration. Additionally, the reserving device may make a preliminary group reservation within the BRAV duration in S19. The group reservation may trigger the GRAV for a sub-interval within the BRAV duration. The group reservation may be made according to S13 to S15.

In some embodiments, the reserving device is configured to support only BRAV or GRAV. As a consequence, a corresponding branch in the flow diagram of FIG. 7 may be utilized and the non-supported branch may be omitted.

Figure 8:
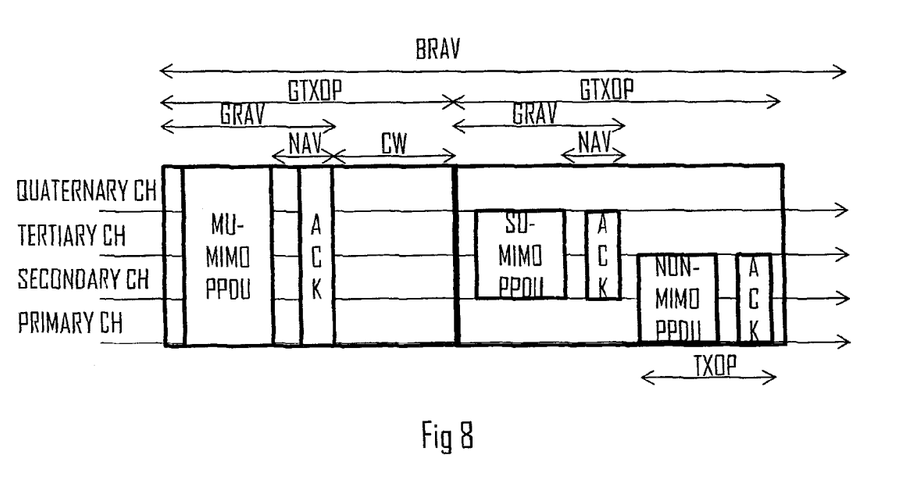
FIG. 8 illustrates an embodiment for using the preliminary reservation in frame transmission and for releasing the channel subsequently according to an embodiment of the invention.

FIG. 8 illustrates an embodiment of using the different types of RAVs. The BRAV may cover a plurality of GTXOPs, e.g. all consecutive GTXOPs reserved in a given BSS. Referring to FIGS. 5A and 5B, the BRAV may cover the total continuous time interval reserved for the BSS1 or BSS2. The duration of the BRAV may be equivalent to the BSS reservation (BRes). The BRes duration may be computed according to the following Equation (3):

$$D_{BRes} = F \frac{RI}{N_{OBSS}} \quad (3)$$

In an embodiment, a different value of F is used for the group reservations and for the BSS reservations. Within the BRes duration, equal time shares of GTXOP may be derived by computing one of the Equations (1) and (2), for example. Each GTXOP may be reserved for MU-MIMO or SU-MIMO transmission. During the first GTXOP, there is a MU-MIMO frame exchange. There may be more than one simultaneous MU-MIMO transmission during the GTXOP according to the MU-MIMO principles using the spatial multiplexing. The MU-MIMO transmission may be uplink or downlink MIMO transmissions. The downlink MU-MIMO transmission may be realized by transmitting according to the allocated user position available to the reserving device from a Group ID Management frame in IEEE 802.11 BSS. Similar procedures for locating and grouping the devices into the MU-MIMO groups may be used in other networks.

The GRAV may initially cover the whole GTXOP duration, e.g. it may be computed by using Equation (1) or (2), and it may be cancelled upon the conclusion of MIMO transmissions, as described above. The residual GTXOP and/or the GRAV-released channels may then become the contention window (CW) for non-MIMO transmissions, wherein the non-MIMO enabled devices may acquire the TXOP by using the EDCA procedures. In this way, the MIMO transmissions will be prioritized before non-MIMO transmissions. In an embodiment, the CW is configured to exist in every GTXOP, thereby preventing the starvation of non-MIMO transmissions. The second GTXOP of FIG. 8 illustrates a SU-MIMO transmission, which may be reserved and validated according to above-described methods. Now, the reserving device may have decided to reserve a shorter duration for the GTXOP so as not to conflict with a periodic non-group reservation represented as TXOP in FIG. 8. In an embodiment, the TXOP may be obtained as a result of winning a contention by using the EDCA procedures. As a consequence, even though the reserving device has a priority over the non-group reservation, it may choose not to overrule the non-group reservation, if it can find a time interval that satisfies its throughput or QoS requirements. The same cognitive resource allocation may be applied to the MU-MIMO reservations.

Above, different types of preliminary reservations are defined, namely a preliminary non-group reservation (Res) referred also to as a solo reservation to define a single-user-single-stream reservation, a preliminary group reservation (GRes) to define a multi-user reservation or a single-user-multi-stream reservation, and a preliminary BSS reservation (BRes) to define a reservation on a BSS level. These reservations trigger respective reservation allocation vectors, namely RAV, GRAV, and BRAV, wherein the reservation allocation vectors may be understood as busy tones generated as a result of the reservation Res, GRes, BRes. The busy tone affects devices intending to make new reservation on the same or a lower reservation hierarchy level as/than the pending reservation. For example, GRAV prevents any Res and GRes, while a RAV allows the device to make an overlapping GRes. A preliminary reservation is logically changed to a TXOP, e.g. a GRes to GTXOP, upon utilizing the preliminarily reserved resources by transmitting a frame in the reserved resource, for example. For example, a GTXOP should be understood as a transmission opportunity for a group transmission which occurs as a result of GRes. It is worthy of note that BRes may comprise at least one or a plurality of GTXOP(s) and/or TXOP(s) as a consequence GRes and/or Res, respectively.

The concept of BRAV may be generalized to embodiments where the group reservations are not used. In an embodiment, the reserving device initiates a preliminary BSS reservation for triggering the BRAV. During the preliminary BSS reservation, the reserving device is caused to transmit a reservation message comprising at least one information element specifying the channel reservation for the BSS of the reserving device, wherein the reservation message makes a preliminary BSS reservation and sets a reservation allocation vector (BRAV) that prevents overlapping reservations in at least one other overlapping BSS. Upon the completion of preliminary BSS reservation, the reserving device or another device of the BSS may be configured to utilize the preliminary BSS reservation by making a preliminary group reservation and/or carrying out channel access during the BRAV and, upon successful reservation and/or channel contention, causing transmission of a frame on the reserved channel. Meanwhile, devices of other overlapping BSSs that detected the BRAV are configured to disable the channel access on the channels and for the duration set by the BRAV. The reserving device that set the BRAV, e.g. an AP, may also release the remaining duration of the BRAV during the BRAV by transmitting an explicit "Release BRAV" information element, e.g. a single bit, in the PLCP header of a frame. In an embodiment, this procedure is executed as a computer program. In an embodiment, the procedure is executed in an apparatus comprising at least one processor and at least one memory including a computer program code, wherein the at least one memory and the computer program code are configured, with the at least one processor, to cause the apparatus to carry out the procedure.

Figure 9:
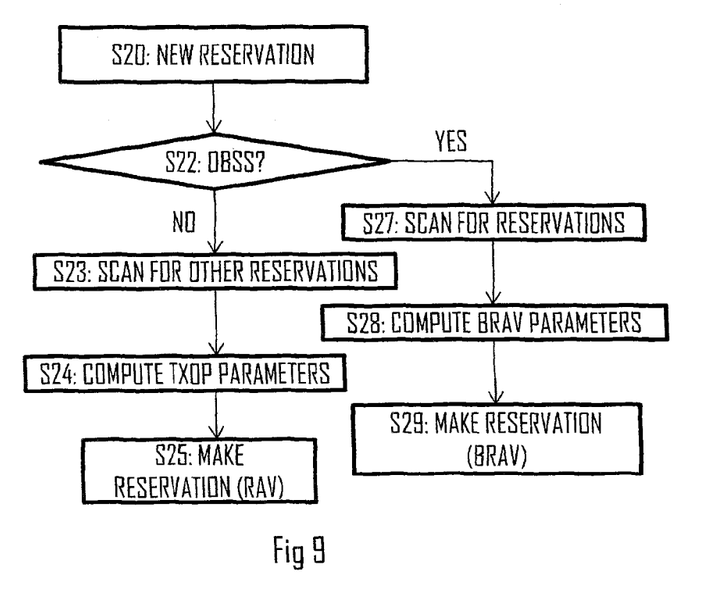
FIG. 9 illustrates flow diagram of a process for setting a network reservation allocation vector.

FIG. 9 illustrates an embodiment of such a procedure as a modification of the flow diagram of FIG. 7. Referring to FIG. 9, the reserving device decides to make a new reservation in S20. In block S22, the reserving device determines the presence/absence of overlapping BSSs. If no overlapping BSSs are detected, the process proceeds to block S23 in which the reserving device determines the currently pending reservations in order to determine an available time interval for the preliminary reservation. In block S24, the TXOP duration and any other parameter related to the reservation are computed. Note that, in general, the TXOP may be a single-user single-stream reservation or, in other words, other than a group reservation. In S25, the reservation is made by transmitting a reservation message that triggers the conventional RAV.

On the other hand, if an overlapping BSS is detected in S22, the process proceeds to S27 in which the reserving device determines the current reservations in any one of the BSSs that overlap. S27 may comprise determining the presence/absence of any BRAV in any one of the OBSSs. As a consequence, a time interval for the preliminary reservation that avoids conflicting with pending reservations and/or transmissions may be derived. The reserved BRes duration and any other parameter related to the reservation are computed in S28. The BRes duration may be computed according to Equation (3), for example. In S29, the preliminary BSS reservation is made by transmitting the reservation message that triggers the BRAV. The BRAV may overrule any conflicting RAV in all OBSSs, as described in the reservation resolution process of FIG. 3.

It should be noted that in all embodiments computing the duration of the reservation, e.g. GRes, according to the number of MIMO groups in the BSS or in the OBSSs, the duration may be recomputed when a change in the MIMO grouping, the number of BSSs in an OBSS, or the reservation interval is detected after the preliminary reservation has been made. For example, the re-computation of the duration may be triggered by detecting a change in the MIMO group count field of Table 2 (see above). In an embodiment where the preliminary reservation covers a plurality of separated reservation intervals, e.g. periodic reservations, the duration may be recomputed and applied between two consecutive reservations. As a consequence, the recomputed duration may be applied to a next reservation interval.

Figure 10:
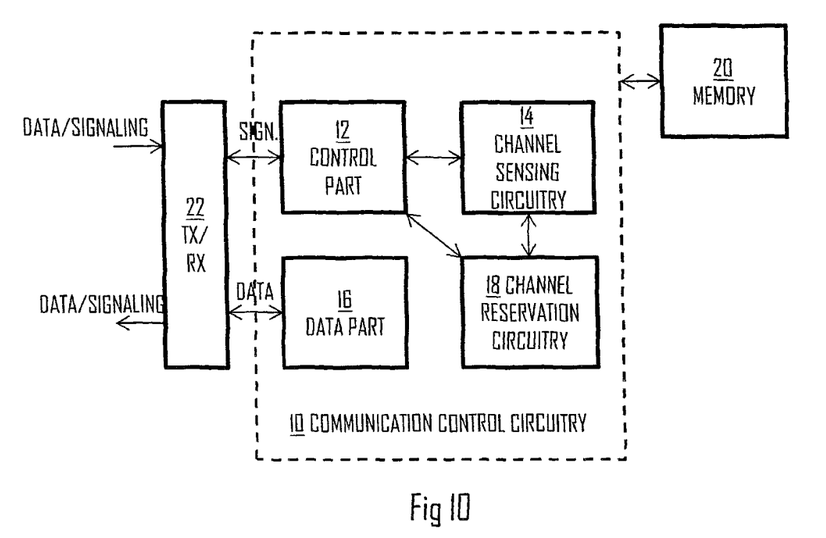
FIG. 10 a block diagram of an apparatus according to an embodiment of the invention.

FIG. 10 illustrates an embodiment of an apparatus comprising means for carrying out the above-mentioned functionalities of the reserving device. The apparatus may be a communication apparatus of an IEEE 802.11 network or another wireless network, e.g. an AP or STA. The apparatus may also be a cognitive radio apparatus capable of adapting its operation to a changing radio environment, e.g. to changes in parameters of another system on the same frequency band. The apparatus may be a computer (PC), a laptop, a tabloid computer, a cellular phone, a palm computer, a fixed base station operating as the AP, or any other apparatus provided with radio communication capability. In another embodiment, the apparatus is comprised in such a communication apparatus, e.g. the apparatus may comprise a circuitry, e.g. a chip, a processor, a micro controller, or a combination of such circuitries in the communication apparatus.

The apparatus may comprise a communication controller circuitry 10 configured to control the communications in the communication apparatus. The communication controller circuitry 10 may comprise a control part 12 handling control signalling communication with respect to transmission, reception, and extraction of control frames including the reservation request messages, the reservation response messages, the reservation advertisement messages, and any other control messages or control frames, as described above. The communication controller circuitry 10 may further comprise a data part 16 that handles transmission and reception of payload data during transmission opportunities of the communication apparatus (transmission) or transmission opportunities of other communication apparatuses (reception). The communication controller circuitry 10 may further comprise a channel reservation controller circuitry 18 configured to carry out at least some of the channel reservation procedures described above. The channel reservation circuitry 18 may carry out the selection of the primary channel of reservation, determine channels to be reserved, determine whether to make a group reservation or a solo reservation, determine the duration of the reservation, control transmission of the reservation request messages, process the received reservation response messages, control transmission and processing of the reservation advertisement messages, control the data transmission/reception in the reserved resources, etc. in the above-described manner. The communication control circuitry 10 may also comprise a channel sensing circuitry 14 configured to monitor for any control messages transmitted by other communication apparatuses within the same BSS or in an overlapping BSS. The channel sensing circuitry 14 may control monitoring for the other reservations and transmissions, and the presence of any one of the NAV, RAV, GRAV, and BRAV. The channel sensing circuitry 14 may also control CCA procedures. Upon reception of a reservation advertisement message through the control part 12, the channel sensing circuitry 14 may extract the reservations indicated in the reservation advertisement message and store the information of the reservation. The stored information of other reservations may then be used as an input in the channel reservation circuitry 18 when the channel reservation circuitry 18 carries out the channel reservation and computes the reservation parameters, e.g. the (G)TXOP duration.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) configuring the apparatus to perform the above-described functionalities of the communication apparatus. The memory 20 may also store communication parameters and other information needed for the wireless communications, e.g. a database comprising current channel reservations and the channel reservation rules. The apparatus may further comprise radio interface components 22 providing the apparatus with radio communication capabilities within the BSS and/or with other BSSs. The radio interface components 22 may comprise standard well-known components such as amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of the process of FIG. 2. In further embodiments, the at least one memory and the computer program code are configured, with the at least one processor, to cause the apparatus to carry out any one of the embodiments related to processing channel reservations, as described above in connection with FIGS. 2 to 9. Accordingly, the at least one processor, the memory, and the computer program code form processing means for carrying out embodiments of the present invention in the wireless communication apparatus.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2A to 10 may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   initiating, in a communication apparatus, a procedure for preliminary channel reservation of a channel, wherein the preliminary channel reservation is related to a spatial multiplexing group transmission;
   causing the communication apparatus to transmit during the preliminary channel reservation procedure a reservation message announcing a preliminary group reservation on the channel; and
   in response to a completed preliminary channel reservation procedure, causing the communication apparatus to utilize the preliminary group reservation by causing transmission of a frame on the channel according to the spatial multiplexing group transmission, wherein the transmission of the reservation message sets a group reservation allocation vector on the channel, wherein the group reservation allocation vector indicates a reservation of the channel for a time but does not actually reserve the channel for a transmission opportunity or set a network allocation vector.

2. The method of claim 1, further comprising prioritizing the preliminary channel reservation related to the spatial multiplexing group transmission over a preliminary channel reservation related to a non-spatial multiplexing single user transmission.

3. The method of claim 2, wherein the prioritization comprises causing the preliminary channel reservation related to the spatial multiplexing group transmission to overlap with a pending preliminary channel reservation related to a non-spatial multiplexing single user transmission.

4. The method of claim 1, further comprising:
   computing a length of time of the preliminary channel reservation according to at least one of a number of current spatial multiplexing groups in a wireless network of the communication apparatus and a number of overlapping wireless networks, wherein the length of time is inversely proportional to the number of the current spatial multiplexing groups in the wireless network and the number of overlapping wireless networks;
   inserting the computed length of time of the preliminary channel reservation in the reservation message.

5. The method of claim 4, further comprising:
   recomputing said length of time of the preliminary channel reservation if at least one of the number of the current spatial multiplexing groups and the number of overlapping wireless networks has changed after the preliminary reservation; and
   inserting the recomputed length of time of the channel reservation into a frame transmitted on the reserved channel.

6. The method of claim 1, wherein the transmission of the frame sets a network reservation allocation vector on the channel and completes the preliminary group reservation, the network reservation allocation vector enabling a reservation to be made in a wireless network of the communication apparatus within a duration of the network reservation allocation vector.

7. The method of claim 1, further comprising prior to the transmission of the reservation message:
   estimating a channel quality metric;
   comparing the channel quality metric with a threshold;
   if the channel quality metric indicates sufficient channel quality on the basis of the comparison, causing the communication apparatus to carry out the preliminary group reservation; and
   if the channel quality metric indicates less than sufficient channel quality on the basis of the comparison, terminating the preliminary channel reservation related to the spatial multiplexing group transmission.

8. The method of claim 1, wherein the preliminary channel reservation procedure relates to a preliminary reservation of the channel for at least one of a single-user spatial multiplexing transmission and a multi-user spatial multiplexing group transmission.

9. The method of claim 8, further comprising selecting between a single-user spatial multiplexing transmission and a multi-user spatial multiplexing group transmission based one at least one criterion.

10. The method of claim 1, further comprising inserting in a frame transmitted during the reservation an information element that explicitly indicates cancellation of the reservation, thereby releasing the reservation of the channel for channel contention by only communication apparatuses that are configured not to use spatial multiplexing transmission.

11. The method of claim 1, further comprising inserting in a frame transmitted during the reservation an information element that explicitly indicates cancellation of the preliminary reservation of the channel for a wireless network of the communication apparatus, thereby releasing the reservation of the channel for channel contention by any communication apparatus in the wireless network or in another wireless network.

12. The method of claim 1, wherein the reservation message is any one of the following messages: a reservation request message addressed to at least one target device, a reservation advertisement message, a beacon message, and a probe response message.

13. The method of claim 1, wherein the transmission of the frame triggers actual channel reservation.

14. The method of claim 1, wherein the transmission of the frame changes the group reservation allocation vector to a network allocation vector.

15. The method of claim 1, further comprising prioritizing group transmissions at least by configuring the preliminary channel reservation procedure to avoid overlapping the preliminary channel reservation for a group with other group reservations.

16. The method of claim 15, wherein configuring the preliminary reservation procedure to avoid overlapping the preliminary channel reservation with other group reservations comprises directing the channel and a time interval to a channel and a time interval where there is no overlapping reservation for the group with other group reservations.

17. An apparatus comprising:
   at least one processor; and
   at least one memory including a computer program code, wherein the at least one memory and the computer program code are configured, with the at least one processor, to cause the apparatus to:
   initiate, in a communication apparatus, a procedure for preliminary channel reservation of a channel, wherein the preliminary channel reservation related to a spatial multiplexing group transmission;

cause a communication apparatus to transmit during the preliminary channel reservation procedure a reservation message announcing a preliminary group reservation on the channel; and in response to a completed preliminary channel reservation procedure, cause the communication apparatus to utilize the preliminary group reservation by causing transmission of a frame on the reserved channel according to the spatial multiplexing group transmission, wherein the transmission of the reservation message sets a group reservation allocation vector on the channel, wherein the group reservation allocation vector indicates a reservation of the channel for a time but does not actually reserve the channel for a transmission opportunity or set a network allocation vector.

18. The apparatus of claim 17, wherein the at least one memory and the computer program code are configured, with the at least one processor, to cause the apparatus to prioritize the preliminary channel reservation related to the spatial multiplexing group transmission over a preliminary channel reservation related to a non-spatial multiplexing single user transmission.

19. The apparatus of claim 18, wherein the at least one memory and the computer program code are configured, with the at least one processor, to cause the apparatus to cause the prioritization to comprise causing the preliminary channel reservation related to the spatial multiplexing group transmission to overlap with a pending preliminary channel reservation related to a non-spatial multiplexing single user transmission.

20. The apparatus of claim 17, wherein the at least one memory and the computer program code are configured, with the at least one processor, to cause the apparatus to:

compute a length of time of the preliminary channel reservation according to at least one of a number of current spatial multiplexing groups in a wireless network of the communication apparatus and a number of overlapping wireless networks, wherein the length of time is inversely proportional to the number of the current spatial multiplexing groups in the wireless network and the number of overlapping wireless networks; and insert the determined length of time of the preliminary channel reservation in the reservation message.

21. The apparatus of claim 20, wherein the at least one memory and the computer program code are configured, with the at least one processor, to cause the apparatus to:

recompute said length of time of the preliminary channel reservation if at least one of the number of the current spatial multiplexing groups and the number of overlapping wireless networks has changed after the preliminary reservation; and insert the changed length of time of the channel reservation into a frame transmitted on the reserved channel.

22. The apparatus of claim 17, wherein the transmission of the frame sets a network reservation allocation vector on the channel and completes the preliminary group reservation, the network reservation allocation vector enabling a reservation to be made in a wireless network of the communication apparatus within a duration of the network reservation allocation vector.

23. The apparatus of claim 17, wherein the at least one memory and the computer program code are configured, with the at least one processor, to cause the apparatus prior to the transmission of the reservation message to:

estimate a channel quality metric;
compare the channel quality metric with a threshold;
if the channel quality metric indicates sufficient channel quality on the basis of the comparison, cause the communication apparatus to carry out the preliminary group reservation; and
if the channel quality metric indicates less than sufficient channel quality on the basis of the comparison, terminate the preliminary channel reservation related to the spatial multiplexing group transmission.

24. The apparatus of claim 17, wherein the preliminary channel reservation procedure relates to a preliminary reservation of the channel for at least one of a single-user spatial multiplexing transmission and a multi-user spatial multiplexing group transmission.

25. The apparatus of claim 17, wherein the at least one memory and the computer program code are configured, with the at least one processor, to cause the apparatus to insert in a frame transmitted during the reservation an information element that explicitly indicates cancellation of the reservation, thereby releasing the reservation of the channel for channel contention by only communication apparatuses that are configured not to use spatial multiplexing transmission.

26. The apparatus of claim 17, wherein the at least one memory and the computer program code are configured, with the at least one processor, to cause the apparatus to insert in a frame transmitted during the reservation an information element that explicitly indicates cancellation of the preliminary reservation of the channel for a wireless network of the communication apparatus, thereby releasing the reservation of the channel for channel contention by any communication apparatus in the wireless network or in another wireless network.

27. The apparatus of claim 17, wherein the reservation message is any one of the following messages: a reservation request message addressed to at least one target device, a reservation advertisement message, a beacon message, and a probe response message.

28. The apparatus of claim 17, further comprising radio interface components providing the apparatus with radio communication capability.

29. A computer program product embodied on a non-transitory distribution medium readable by a computer and comprising program instructions which, when loaded into an apparatus, execute a computer process comprising:

initiating, in a communication apparatus, a procedure for a preliminary channel reservation of a channel, wherein the preliminary channel reservation is related to a spatial multiplexing group transmission;

causing the communication apparatus to transmit during the preliminary channel reservation procedure a reservation message announcing a preliminary group reservation on the channel; and in response to a completed preliminary channel reservation procedure, causing the communication apparatus to utilize the preliminary group reservation by causing transmission of a frame on the reserved channel according to the spatial multiplexing group transmission, wherein the transmission of the reservation message sets a group reservation allocation vector on the channel, wherein the group reservation allocation vector indicates a reservation of the channel for a time but does not actually reserve the channel for a transmission opportunity or set a network allocation vector.

* * * * *